UNITED STATES PATENT OFFICE.

CARLETON ELLIS, OF MONTCLAIR, NEW JERSEY.

PROCESS OF TREATING WOOL-GREASE AND PRODUCT THEREOF.

1,086,357.　　　　Specification of Letters Patent.　　Patented Feb. 10, 1914.

No Drawing.　　　Application filed February 7, 1912. Serial No. 675,920.

*To all whom it may concern:*

Be it known that I, CARLETON ELLIS, a citizen of the United States, and a resident of Montclair, in the county of Essex and State of New Jersey, have invented certain new and useful Improvements in Processes of Treating Wool-Grease and the Product Thereof, of which the following is a specification.

This invention relates to the process of making mixtures of purified wool grease and the like of improved quality and relates in particular to the production of lanolin mixtures or lanolin-like composite bodies, *i. e.*, bodies resembling lanolin in composition or qualities, all as more fully hereinafter described and as claimed.

The manufacture of lanolin in the usual way involves a long series of treatments to remove from the crude wool grease its disagreeable odor and its yellow or brown color.

The present invention has for one of its objects the production of lanolin like bodies without resort to this costly treatment by simple treatment with hydrogen under conditions bringing about the absorption of the latter by the offensively smelling and unsaturated components of the wool grease.

It has been shown by Sabatier and Senderens and others that unsaturated bodies take up hydrogen in the presence of nickel and other catalyzers to form saturated compounds. The present invention is based on this reaction and the methods herein set forth afford products new in the art and of great utility.

In carrying out my process I take a good quality of wool grease, for example, and subject it to the action of hydrogen at a temperature of from say 150° C. to 200° C. or thereabout in the presence of a catalyst such as a metallic nickel or palladium, preferably supported on a mineral carrier such as pumice or infusorial earth. Preferably the hydrogen is applied at about 10 pounds pressure, although greater or less pressures may be used if desired. The melted wool grease may be agitated with the catalyzer or as indicated in U. S. Letters Patent No. 1,026,156, simply allowed to flow along a trough carrying a lining or deposit of the catalytic material. Or the material may be sprayed along with the catalyzer into an atmosphere of hydrogen. If desired water gas or other hydrogen containing gas may be used in lieu of pure hydrogen. In order to purify hydrogen obtained from sources containing arsenic and the like which seem to poison the catalyzer or impair its efficiency, I may pass this gas over basic slag or other absorptive material to furnish a gas inert as regards depreciation of the catalyzer. Steam in a superheated condition may also be used in certain instances, especially when a light colored product of special consistency is desired.

Catalytic nickel may be obtained for example by igniting nickel nitrate on a suitable supporting material and reducing in a current of hydrogen at the requisite temperature. Prolonged heating in a current of nitrogen or atmosphere thereof, after reduction, affords a catalyst not easily oxidizable by superheated steam.

The hydrogenated wool grease may if desired be used without further purification but if a refined or lanolin-like product is required the hydrogenated material may be washed and bleached if necessary, and in case it be desired to remove bodies soluble in alkali, washing with dilute alkaline solutions may be resorted to. Without further treatment than hydrogenation as above indicated the wool grease usually has an improved consistency and appearance, which gives these products a wider scope of use in the arts.

The use of a metallic catalyzer in the presence of an acid body may cause the formation of a metallic soap which is usually undesirable, and to avoid this I may heat the material at the time of hydrogenation to a temperature above which the soap cannot exist as such, but if formed immediately decomposes so that the catalyzer does not enter into solution to any undesired extent. By holding at a temperature about 10° C. above the decomposition point, formation of metallic soaps or metallo-organic bodies largely is prevented. This temperature varies with the organic body under treatment, and preferably is determined by forming in any suitable manner the metallo-organic compound and then gradually heating until the decomposition-point is reached. This temperature may thus establish the conditions governing the procedure with respect to the material in hand.

The product of the present invention is an unctuous material of good consistency and is a mixture comprising the naturally saturated compounds of wool grease and the artificially saturated compounds thereof.

What I claim is:—

1. The process of improving the quality of wool grease which comprises treating with hydrogen in the presence of a catalytic body.

2. The process of improving the quality of wool grease which comprises treating with hydrogen in the presence of a nickel catalyst.

3. The process of improving the quality of wool grease which comprises treating with hydrogen under about 10 pounds pressure in the presence of a nickel catalyst.

4. The process of improving the quality of wool grease which comprises treating with hydrogen free from arsenic, at about 10 pounds pressure, in the presence of a nickel catalyst.

5. The process of improving the quality of wool grease which comprises treating with hydrogen free from arsenic, at about 10 pounds pressure and at a temperature above the temperature of decomposition of nickel soap, in the presence of a nickel catalyst.

6. The process of improving the quality of wool grease which comprises treating same with hydrogen, free from arsenic, at about ten pounds pressure and at a temperature about 10° C. above that of decomposition of nickel soap, in the presence of a nickel catalyst.

7. The process of making mixed lanolin-like bodies which comprises treating wool grease and the like with hydrogen in the presence of a nickel catalyst and at a temperature above that of decomposition of nickel soaps of wool grease.

8. The herein described process of improving the quality of wool grease, which consists in hydrogenating the offensively smelling unsaturated constituents of such grease.

9. As an unctuous material of good consistency, a mixture comprising the naturally saturated compounds of wool grease, and artificially (hydrogen) saturated compounds thereof.

Signed at Montclair, in the county of Essex and State of New Jersey, this 5th day of February, A. D. 1912.

CARLETON ELLIS.

Witnesses:
BIRDELLA M. ELLIS,
NATHANIEL L. FOSTER.